United States Patent
Becker et al.

(10) Patent No.: US 11,301,923 B2
(45) Date of Patent: Apr. 12, 2022

(54) AUTOMATIC WEB BROWSING IN ELECTRONIC MESSAGING INTERFACE METHOD AND APPARATUS

(71) Applicant: OATH INC., New York, NY (US)

(72) Inventors: Marcel Becker, San Jose, CA (US); Anand Almal, San Jose, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 309 days.

(21) Appl. No.: 16/531,371

(22) Filed: Aug. 5, 2019

(65) Prior Publication Data

US 2021/0042818 A1 Feb. 11, 2021

(51) Int. Cl.
*G06Q 30/06* (2012.01)
*G06F 21/31* (2013.01)
*H04L 51/08* (2022.01)
*H04L 51/063* (2022.01)

(52) U.S. Cl.
CPC ......... *G06Q 30/0641* (2013.01); *G06F 21/31* (2013.01); *H04L 51/063* (2013.01); *H04L 51/08* (2013.01)

(58) Field of Classification Search
CPC ... G06Q 30/0641; H04L 51/063; H04L 51/08; G06F 21/31
See application file for complete search history.

(56) References Cited

U.S. PATENT DOCUMENTS

| | | | | |
|---|---|---|---|---|
| 10,311,478 B2 * | 6/2019 | Dai | | G06Q 30/0267 |
| 10,686,748 B1 * | 6/2020 | Dorsey | | H04W 4/14 |
| 2004/0172254 A1 * | 9/2004 | Sharma | | G10L 15/26 |
| | | | | 704/270.1 |
| 2005/0015797 A1 * | 1/2005 | Noblecourt | | H04N 21/4782 |
| | | | | 725/32 |
| 2008/0306913 A1 * | 12/2008 | Newman | | G06F 16/9535 |
| 2012/0030294 A1 * | 2/2012 | Piernot | | H04L 67/2814 |
| | | | | 709/206 |
| 2013/0254314 A1 * | 9/2013 | Chow | | G06F 16/957 |
| | | | | 709/206 |
| 2015/0294377 A1 * | 10/2015 | Chow | | G06Q 30/0282 |
| | | | | 705/347 |
| 2017/0104874 A1 * | 4/2017 | Yi | | G06Q 30/0277 |
| 2017/0195394 A1 * | 7/2017 | Kothari | | H04L 65/1069 |
| 2020/0057952 A1 * | 2/2020 | Vick | | G06Q 10/04 |

* cited by examiner

*Primary Examiner* — Sargon N Nano

(74) *Attorney, Agent, or Firm* — James J. DeCarlo; Greenberg Traurig, LLP

(57) ABSTRACT

Disclosed are systems and methods for improving interactions with and between computers in content generating, searching, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatically allowing web browsing in a user interface of an electronic messaging system. The disclosed systems and methods automatically display electronic messages containing item information displayed in an electronic message in place of any web page links associated with the item enabling browsing of the item information from within the electronic messaging system's user interface.

20 Claims, 10 Drawing Sheets

AUTOMATIC WEB BROWSING IN ELECTRONIC MESSAGING INTERFACE METHOD AND APPARATUS

FIELD OF THE DISCLOSURE

The present disclosure relates to improvements to electronic messaging systems and specifically to providing a capability to browse web-linked information using an electronic messaging system's user interface.

BACKGROUND

Currently, an electronic messaging system provides a capability for viewing electronic messages using the electronic messaging system's user interface (e.g., a user interface of the electronic messaging system displayed using a client application, such as and without limitation an electronic messaging client application, a browser application, etc.). An electronic message viewed using the system's user interface may contain a third-party link (e.g., a link to a web page of an entity, or provider), which when activated by the electronic messaging system user causes the user to be transferred from the electronic messaging system and its user interface to a web page of the third party. This approach causes the electronic messaging system to lose control of its user, when the user is diverted to the third party's web page upon the user's selection of the third-party link in the electronic message being viewed by the user using the electronic messaging system.

SUMMARY

The present disclosure provides novel systems and methods for automatic web browsing in an electronic messaging system user interface. Electronic messages are an efficient mechanism for online providers to communicate with online users.

An electronic messaging system typically receives an electronic message, from an online provider as the sender (of the electronic message) and forwards the electronic message to a recipient (e.g., a user of the electronic messaging system). The electronic messaging system provides, via a user interface, a number of electronic messaging tools for use by the user in viewing and handling electronic messages.

The electronic messaging system is accessible via a number of different ways. For example, the electronic messaging system can be accessed via a client application executing on a user device, such as and without limitation a smartphone, tablet, laptop, desktop, or other computing device. As yet another example, the electronic messaging system can be accessed via the web. To access electronic messaging system via the web, the user typically navigates to a web address of the electronic messaging system using a web browser. The electronic messaging system typically has at least one computing device (e.g., a server computing device) to respond to the user of the client application and/or the user.

The electronic messaging system user (the recipient of the electronic message) uses the electronic messaging system's tools to open and view an electronic message. An online provider typically includes one or more links to its web site in an electronic message in order to attract the electronic messaging system user to the online provider's web site. In a conventional approach, the electronic messaging system displays the link(s) when the electronic message is displayed, and when the electronic messaging system user clicks on a link displayed in the message, the user is transferred from the electronic messaging system to the online providers web site (e.g., a web page of the online provider identified in the link displayed in the electronic message is opened by a browser application).

Consequently and in such a conventional approach, when the user clicks on the link and is transferred to the online provider's web page, the electronic messaging system loses control of the user, when the electronic messaging system user is transferred from the electronic messaging system (and the displayed electronic message) to the linked web page (e.g., a display of the linked web page in a browser application). An online merchant is one example of an online provider that typically sends a number of electronic messages each of which contains a number of links, and selection of any such link results in the electronic message user being transferred to the online merchant's website and away from the conventional electronic messaging system causing the conventional electronic messaging system to lose control of the user. Once the conventional electronic messaging system losses control of the user, it cannot control the user's online interaction and experience. In addition and once the user clicks on an embedded link, the user is transferred from the electronic messaging system (and its user interface familiar to the user) to an unfamiliar, inconsistent user interface provided by the online provider.

Embodiments of the present disclosure improve over the conventional electronic messaging system's approach and provide an improved electronic messaging system that automatically displays an online provider's linked information in the electronic messaging system's user interface. The linked information is displayed in place of the online provider's web page links. In so doing, the electronic messaging system retains control of the user while allowing the user to browse the information of the online provider from within a familiar, consistent user interface provided by the electronic messaging system. With the electronic messaging system provided in accordance with at least one embodiment of the present disclosure, the user of the electronic messaging system can peruse information and/or items (e.g., items offered by an online merchant) using the electronic messaging system's user interface consistent and familiar to the user of the electronic messaging system.

In accordance with at least one embodiment, the improved electronic messaging system comprises a mechanism for maintaining a digital store of items selected by the user from one or more electronic messages sent by one or more online providers and displayed by the electronic messaging system. By way of some non-limiting examples, an item can be a product, good, service, etc. The digital store of user-selected items can be represented in the electronic messaging system's user interface as a user interface element (e.g., a shopping cart user interface element).

In accordance with at least one embodiment, the electronic messaging system provides an ability to process requests (e.g., order, add, delete, update) by the user in connection with items in the digital item storage of user-selected items. In accordance with at least one embodiment, the disclosed systems and methods can maintain a digital item storage for user-selected items associated with a single online provider or for user-selected items associated with more than one online provider. In accordance with at least one embodiment, the digital store of user-selected items can store items associated with different online providers, so that the digital store of user-selected items can comprise items from different online providers at any time. Alternatively, the discloses systems and methods can maintain multiple digital stores of user-selected items (e.g., a different digital store for each online provider) for a user. In any case, the disclosed systems and methods can maintain a digital store of user-selected items selected by a user from different electronic messages (of one or more online providers).

According to some embodiments, the disclosed systems and methods first receives a request to display an electronic message including a number of items of an online provider. For example, a user of the electronic messaging system's user interface can select the electronic message (e.g., from a listing of electronic messages) with a command to open the electronic message. The electronic message that is displayed in response to the request excludes any web page links (or other web links) to the online provider's web site. That is, the electronic message, which is received from a sender (e.g., an online merchant), can include links, each of which corresponds to an item (e.g., an item available from the online merchant). In a case that the electronic message contains a link (or links), the link references a web page (e.g., a web page provided by the sender) containing information about the corresponding item.

In accordance with one or more embodiments, in the case that the electronic message contains one or more links (e.g., each link can correspond to an item, or a linked item, associated with the sender of the electronic message), each link contained in the electronic message is replaced with a short description of the linked item prior to the display of the contents of the electronic message. Consequently, unlike the conventional approach of displaying a sender's link (e.g., to a web page corresponding to the linked item), the disclosed systems and methods display an electronic message without the link—information about the linked item is displayed in place of the link.

In accordance with one or more embodiments, the electronic message from the sender can be received with a short description of each item rather than a link for each item. The disclosed systems and methods make a determination whether or not the user-selected electronic message contains links or short descriptions. In the case that the electronic message contains item links, the disclosed systems and methods replace each link with an item description.

In accordance with one or more embodiments, in a case that a linked item is available for order, the electronic message that is displayed includes an "Add" button to add the item to a digital store of items selected by the user and maintained by the electronic messaging system. In addition to an ability to add an item to the digital store of user-selected items, the disclosed systems and methods provides tools for use in the electronic messaging system to edit the digital store of user-selected items (e.g., delete an item from the digital store of user-selected items, change the quantity of an item included in the digital store, etc.) and to submit an order request, from within the electronic messaging system (and its user interface) to order the item(s) in the digital store of the user-selected items from the online provider(s) associated with each item in the digital store.

In accordance with one or more embodiments, the digital store of user-selected items can comprise, for each item in the digital store, item identification information (e.g., item name, part number, model number, stock keeping unit (SKU), universal product code (UPC), International Standard Book Number (ISBN), online provider's unique item identification code), online provider identification information (e.g., online provider's name, universal resource locator (URL), etc.) and user-specified information such as and without limitation quantity, size, color, etc.

In accordance with one or more embodiments, in response to an order request received from the user interface of the electronic messaging system and by a user of the electronic messaging system, the disclosed systems and methods process the request with respect to each item in the digital store of user-selected items (e.g., the digital store of user-selected items associated with the order request and maintained by the electronic messaging system) by coordinating with each online provider having an item in the digital store of user-selected items. In a case that the digital store of the user's selected items includes items from a number of online providers, the disclosed systems and methods coordinate the user's request with each online provider.

In accordance with one or more embodiments, the disclosed systems and methods comprise an online wallet mechanism to store and manage a user's information, including without limitation logins to online providers, passwords, shipping address, billing address and credit card details. The online wallet mechanism provides tools to add, delete, update, etc. user information in a digital store.

In accordance with one or more embodiments, the online wallet mechanism is used to coordinate the user's order request. In accordance with one or more embodiments, the electronic messaging system submits an order to an online provider (e.g., an online merchant), including identifying each item in the digital store of user-selected items associated with the online provider.

In accordance with at least one embodiment, an order can be submitted to an online provider using the merchant's Application Programming Interface (API). For example, the online provider's API can be used to act on the user's behalf and submit the order to the online provider. Examples of information provided to the online provider include without limitation the user's information (e.g., some or all of login name and password, name, billing address, shipping address, credit card information, etc.) and item information (item identification information, quantity, size, color, etc.). Information received from the online provider regarding the order, such as confirmation of the order, shipping, delivery, etc. is provided to the user via the electronic messaging system's user interface. Other options for handling the user's order request include without limitation use of OBI (Open Buying on the Internet) and Epay. OBI provides a standardized approach for business-to-business purchasing on the web. OBI allows orders to be securely placed and payment made. Epay provides a mechanism for processing payment.

It will be recognized from the disclosure herein that embodiments of the instant disclosure provide improvements to a number of technology areas, for example those related to systems and processes that handle or process electronic messages, electronic commerce systems and processes and the like. The disclosed systems and methods can effectuate an electronic messaging system's control of its users, effectuate a familiar, consistent user interface across online providers (e.g., the senders of electronic messages), effectuate increased speed and efficiency in the ways that users can use the electronic messaging system to access linked information using a consistent user interface across the online providers without leaving the electronic messaging system's environment (including its application features and user interface), and minimize user effort, as the disclosed systems and methods, inter alia, eliminate the need for the user to transfer from the electronic messaging system, provide a consistent user interface, for the user, across online providers sending electronic message to the user of the electronic messaging system and keep the user in the electronic messaging system's environment.

Users are provided with a fully automated experience through the disclosed systems' and methods' use of a consistent user interface across online providers (e.g., the senders of the electronic messages to electronic system users) for displaying linked information rather than transferring the user to a browser upon user selection of a web link. For example, the disclosed systems and methods use its consistent user interface for all online providers to display item information rather than web links (displayed by a conventional electronic messaging system), so that the user can view the item information using the electronic message system, and its consistent user interface, without the need to select a link embedded in an electronic message and leave the electronic messaging system. In addition, the disclosed systems and methods can process item selections retained in a digital store of user-selected items by the electronic messaging system for the user and to submit an order for the user-selected items in the digital store, so that the user need not leave the electronic messaging system, or navigate to an online provider's web site, to view and order items from online providers.

In accordance with one or more embodiments, a method is disclosed which includes receiving, at a computing device, a request from a user for display of an electronic message, from an online provider and directed to the user of the electronic messaging system, in a user interface of an electronic messaging system. In response to the user request for the electronic message's display, the electronic message is retrieved, via the computing device and from a digital store of the electronic messaging system. The retrieval of the electronic message comprising ensuring that any web page link of the online provider associated with any item of the online provider referenced in the electronic message is excluded from the electronic message, the ensuring comprising ensuring that information about an item of the online provider is contained in the electronic message rather than an associated web page link of the online provider for the item.

The electronic message, with the information about each item rather than the web page link associated with the item, is displayed in the electronic messaging system's user interface, via the computing device and in response to the display request of the user. Item selection input of the user is received, via the computing device and in the electronic messaging system's user interface, the received item selection input indicating a selection of an item from the display of the electronic message. Information about the selected item is stored, via the computing device and in the digital store of the electronic messaging system.

In response to the user selection input, a user interface element representing a digital store of user-selected items is displayed in the electronic messaging system's user interface, via the computing device, the user interface element comprising an indicator that the selected item is stored in the digital store of user-selected items. A request of the user regarding the item included in the digital store of user-selected items is received, via the computing device and the user interface element displayed in the electronic messaging system's user interface. At least one operation is performed, via the computing device and using the electronic messaging system, in response to the request of the user regarding the item included in the digital store of user-selected items.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatic web browsing in an electronic messaging system user interface.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
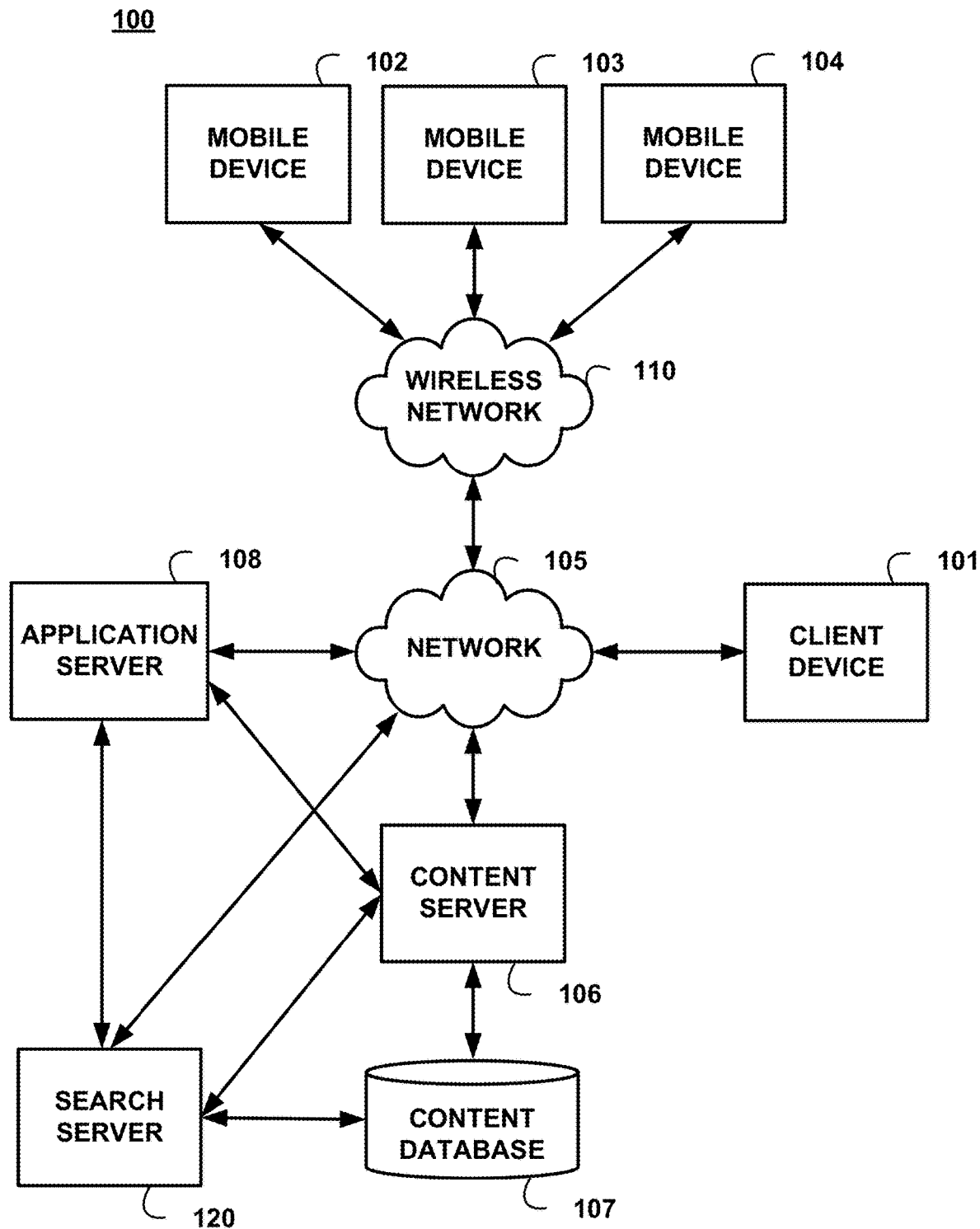
FIG. 1 is a schematic diagram illustrating an example of a network within which the systems and methods disclosed herein could be implemented according to some embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The vast majority of electronic messages (e.g., an electronic mail message, or email message) received by users of an electronic messaging system are sent by online providers (e.g., online merchants, e-commerce providers, etc.) that embed links in their electronic messages. When a user of the electronic messaging system activates a link in an electronic message displayed by the electronic messaging system, the user is transferred from the electronic messaging system to a web page (and a browser application displaying the web page) of the online provider whose link is activated. This approach causes the electronic messaging system to lose control of its user, when the user is diverted to the online provider's web page upon the user's selection of the link in the electronic message being viewed by the user using the electronic messaging system. Once the user clicks on an embedded link, the user is transferred from the electronic messaging system (and its user interface familiar to the user) to an unfamiliar interface provided by the online provider.

As such, the instant disclosure provides a novel solution addressing the immediate demand for an automated system, application and/or platform that allows an electronic messaging system to maintain control of its users and to effectuate a consistent, familiar user interface in which its users can view information (e.g., linked information) of any online provider sending electronic messages to its users, and that effectuates increased speed and efficiency in the ways that users can use the electronic messaging system to access such information using a consistent user interface across the online providers without leaving the electronic messaging system's environment (including its application features and user interface), and minimize user effort. The present disclosure provides novel systems and methods for automatic web browsing in an electronic messaging system user interface.

According to some embodiments, the disclosed systems and methods receive, in a user interface of the electronic messaging system from a user of the electronic messaging system, a request for display of an electronic message originating from an online provider and directed to the user of the electronic messaging system, in a user interface of an electronic messaging system. In response to the user request for the electronic message's display, the electronic message is retrieved from a digital store of the electronic messaging system. The retrieval of the electronic message comprises ensuring that any link of the online provider associated with any item of information, available from the online provider referenced in the electronic message, is excluded from the electronic message, the ensuring comprising ensuring that information about an item of the online provider is contained in the electronic message rather than an associated web page link of the online provider for the item. The electronic message, with the information about each item rather than the web page link associated with the item, is then displayed in the electronic messaging system's user interface in response to the display request of the user. Item selection input of the user is received, via the electronic messaging system's user interface, the received item selection input indicating a selection of an item from the display of the electronic message. Information about the selected item is then stored, in the digital store of the electronic messaging system.

In response to the user selection input, a user interface element representing a digital store of user-selected items is displayed in the electronic messaging system's user interface, via the computing device, the user interface element comprising an indicator that the selected item is stored in the digital store of user-selected items. A request of the user regarding the item included in the digital store of user-selected items is received, via the user interface element displayed in the electronic messaging system's user interface. At least one operation is then performed, using the electronic messaging system, in response to the request of the user regarding the item included in the digital store of user-selected items.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as, by way of non-limiting examples, content server 106, application (or "App") server 108, search server 120 and advertising ("ad") server (not shown).

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108 and/or 120. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120, or an ad server or ad network.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
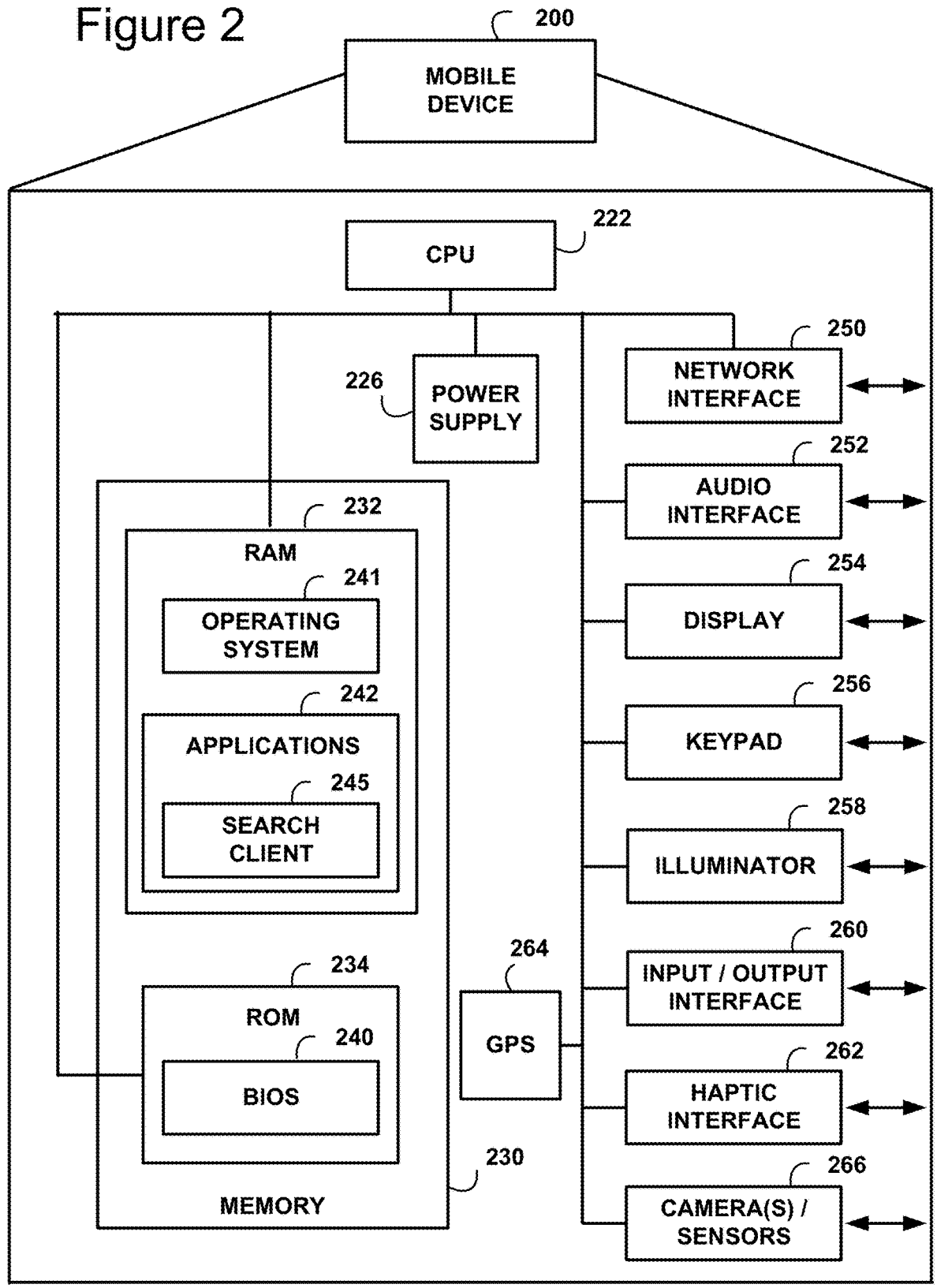
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 3:
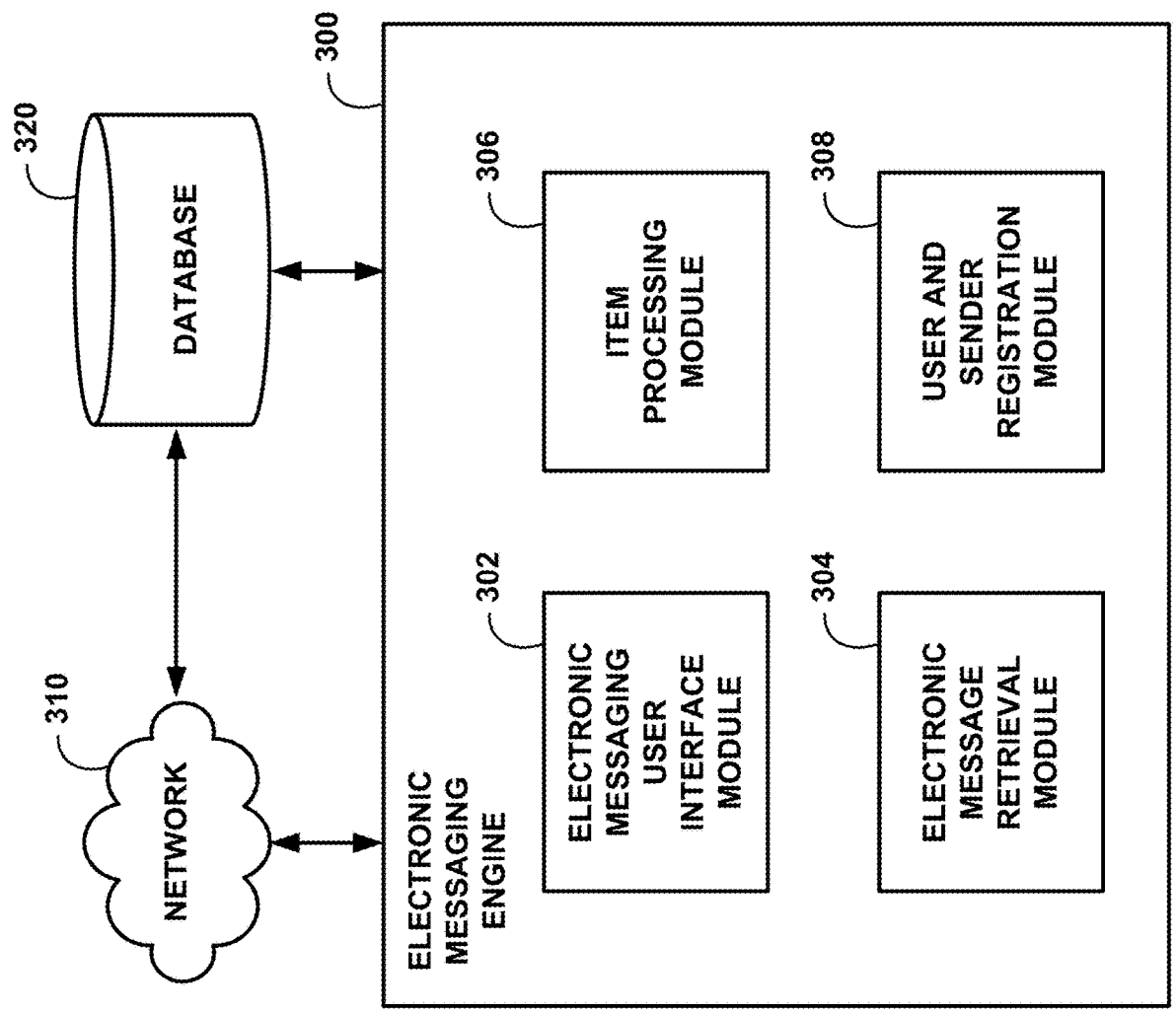
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes an electronic messaging engine 300, network 310 and database 320. The electronic messaging engine 300 can be a special purpose machine or processor and could be hosted by an application server, content server, social networking server, web server, search server, content provider, email service provider, ad server, user's computing device, and the like, or any combination thereof.

According to some embodiments, electronic messaging engine 300 can be embodied as a stand-alone application that executes on a user device (e.g., client device 101, mobile device 102, 103 or 104, or mobile device 200). In some embodiments, the electronic messaging engine 300 can function as an application installed on the user's device, and in some embodiments, such application can be a web-based application (e.g., an electronic messaging system application executing on a server, such as and without limitation application server 108) accessed by the user device over a network.

The database 320 can be any type of database or memory, and can be associated with a server on a network (such as and without limitation a content server, search server, application server, etc.,) or a user's device. Database 320 comprises a dataset of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof.

In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store electronic messages of users of the electronic messaging system, such as and without limitation electronic messages sent and received by the users. In some embodiments, database 320 can store information about those items selected by a user. For example and for a given item selected by a user, database 320 can store information identifying the user and the item selected by the user. By way of a further non-limiting example, the item information can include without limitation some or all of an item name, part number, model number, stock keeping unit (SKU), universal product code (UPC), International Standard Book Number (ISBN), online provider's unique item identification code, online provider identification information (e.g., online provider's name, universal resource locator (URL), etc.) and user-specified information such as and without limitation quantity, size, color, etc.

In some embodiments, database 320 can store information associated with each order submitted by the user, such as and without limitation, order date, order status, items ordered, online provider to which the order was submitted, etc. In some embodiments, database 320 can store user information, which may be gathered when the user registers with the electronic messaging system and thereafter. Such user information can include without limitation, the user's name, login information (e.g., login name and password), geographic address (e.g., shipping address, place of residence, etc.), credit card information (e.g., name on card, credit card number, expiration, authorization number or code, etc.).

For purposes of the present disclosure, electronic mail messages and electronic mail systems are discussed without some embodiments; however, it should not be construed to limit the applications of the systems and methods discussed herein. That is, while reference is made throughout to email messages and email systems, other forms of electronic messages (and corresponding systems), such as and without limitation text messages, instant messages, etc. can be used without departing from the scope of the instant application, which can thereby be communicated and/or accessed and processed by the electronic messaging engine 300 according to the systems and methods discussed herein.

The network 310 can be any type of network such as, but not limited to, a wireless network, a local area network (LAN), wide area network (WAN), the Internet, or a combination thereof. The network 310 facilitates connectivity of the electronic messaging engine 300, and the database of stored resources 320. Indeed, as illustrated in FIG. 3, the electronic messaging engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as electronic messaging engine 300, and includes electronic messaging user interface module 302, electronic message retrieval module 304, item processing module 306, and user registration module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the electronic messaging engine 300 can be supplied to the database 320 and retrieved from the database 320 as discussed herein.

Figure 4:
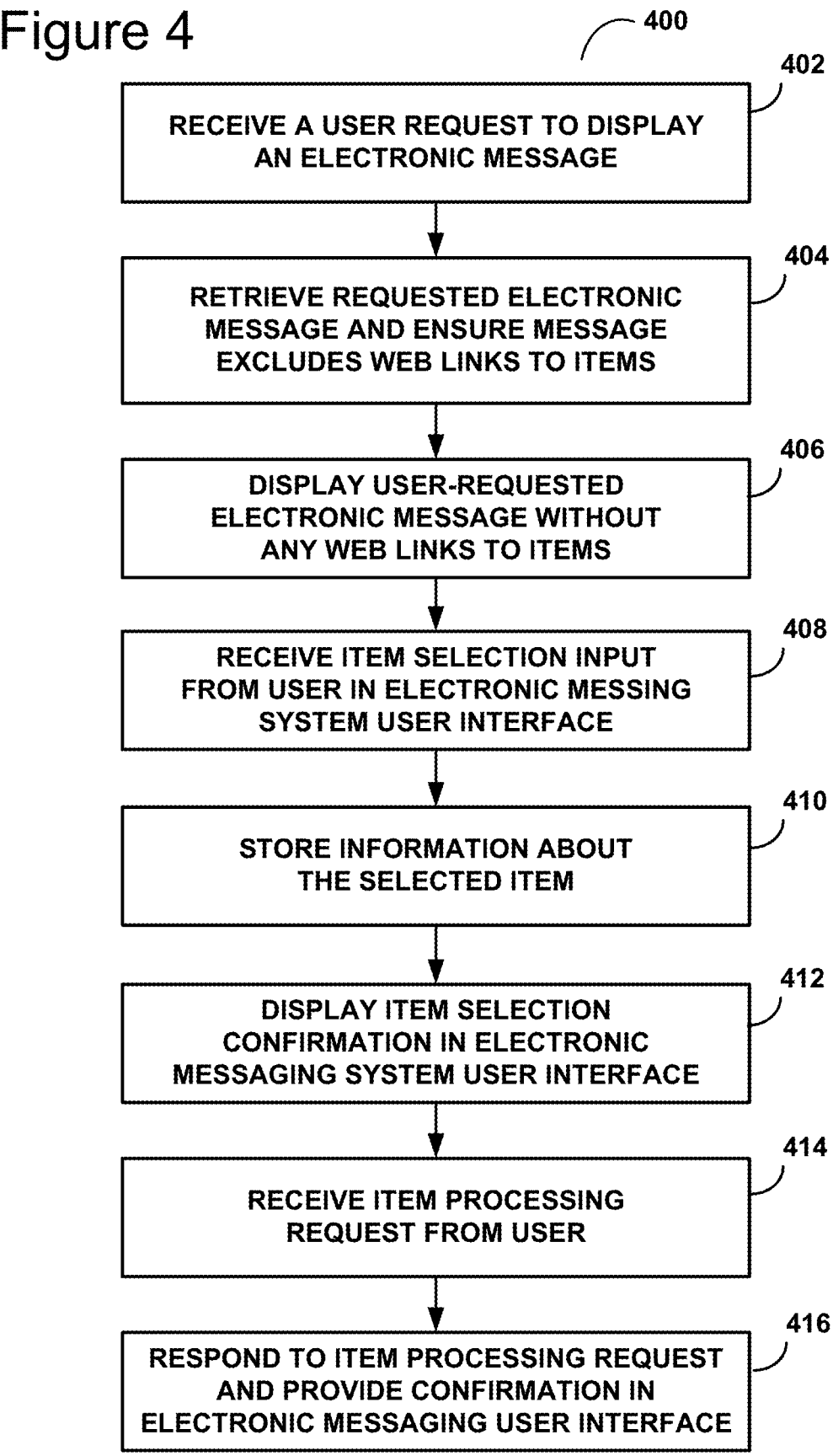
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for automatic web browsing in an electronic messaging system user interface. According to some embodiments, as discussed herein with relation to FIG. 4, the process involves automatic web browsing in an electronic messaging system user interface.

In accordance with at least one embodiment, the disclosed systems and methods ensure that any electronic message (e.g., an electronic email message from an online provider) that is displayed in the electronic message system's user interface (provided by electronic messaging user interface module 302) is displayed without any web page link to a web page (or other online web resource) of the sender and associated with any item referenced in the electronic message. Rather than a web page link, which upon activation by the user would take the user from the electronic messaging system to the linked web page, the disclosed systems and methods ensure that information about the item (of the online provider) is displayed in the electronic message in place of the web page link.

In accordance with some embodiments, the disclosed systems and methods respond to item selection input of the user via the electronic messaging system's user interface, and store (in a digital store of the electronic messaging system—included in database 320) information associated with the user-selected item. In addition, a user interface element is displayed in the electronic messaging system's user interface indicating that the selected item is stored in the digital item store. The disclosed systems and methods can respond to a request of the user regarding the item included in the item store and at least one operation is then performed, using the electronic messaging system, in response to the request of the user regarding the item included in the digital store of user-selected items.

At step 402, a request is received by messaging engine 300 (e.g., via electronic messaging user interface module 302) from a user of the electronic messaging system. The request is a request to retrieve, open and display (in the user interface of the electronic messaging system—the user interface provided by electronic messaging user interface module 302) an electronic message from an online provider and directed to the user of the electronic messaging system. By way of a non-limiting example, the online provider can be an e-commerce entity such as and without limitation an online merchant and the electronic message requested by the user for display can comprise information about items available from the online provider.

Figure 5:
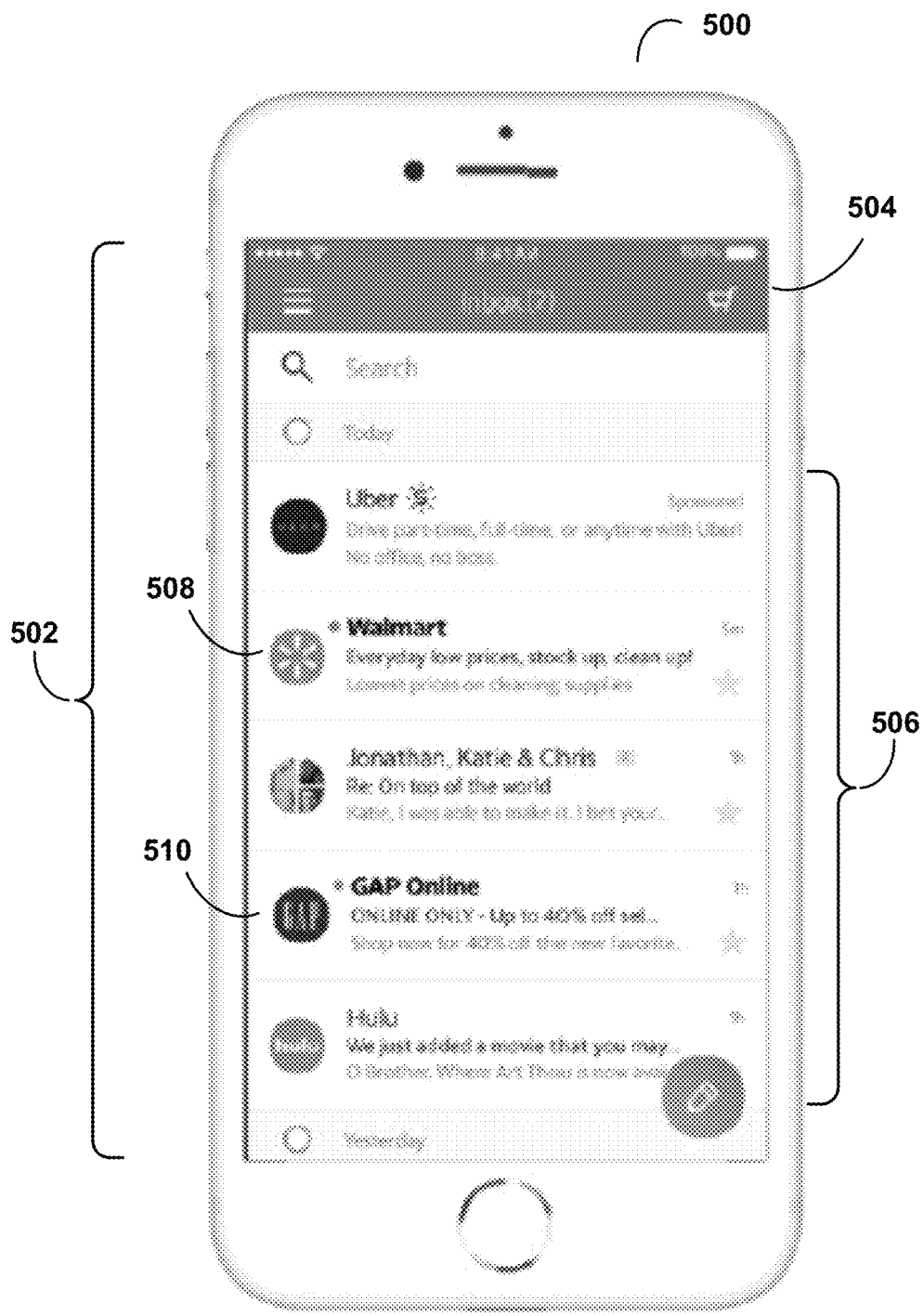
FIG. 5-9 are diagrams of an exemplary example of a non-limiting embodiment in accordance with some embodiments of the present disclosure.

For example, a user of the electronic messaging system's user interface can select the electronic message (e.g., from a listing of electronic messages) and select a command to open the electronic message. Reference is made to FIG. 5 which provides an exemplary example of a display 502 of the user interface provided by electronic messaging user interface module 302 for display by a client device 500. With reference to display area 504, display 502 indicates that the display area 506 provides a listing of some of the emails in the user's inbox mail folder. In the example shown in FIG. 5, the user's inbox mail folder includes a message from Walmart® in connection with its e-commerce web site.

In a conventional approach discussed above, in connection with its e-commerce web site, Walmart® typically includes at least one web page link to items that are available for order via its web site. In addition and with the conventional approach, activation of the web link by the user in the email message would transfer the user from the electronic messaging system (and its user interface that is familiar to the user) to the web page linked in the email message. There is no consistency between the web page user interface used by Walmart® and any other online provider (e.g., the Gap® Online web page user interface associated with a web page link in email message 510).

The disclosed systems and methods, inter alia, retain control of the user, provide a consistent, familiar user interface (of the electronic messaging system) across online providers, eliminate the need for the user to access different, unfamiliar web page user interface and provide a mechanism for the electronic messaging system user to browse item(s) offered by any online provider (e.g., Walmart®, the Gap® Online, etc.) from within the user interface of the electronic messaging system.

The electronic message, which is received from a sender (e.g., an online merchant in connection with its e-commerce web site), can include links, each of which corresponds to an item (e.g., an item available from the online merchant's web site). In a case that the electronic message contains a link (or links), the link references a web page (e.g., a web page provided by the sender) containing information about the corresponding item. In accordance with embodiments of the present disclosure, in a case that the electronic message contains any web links associated with items of the online provider, the web links are replaced by information about the item extracted from one or more of electronic message (e.g., the link, header information, information in the body of the message, etc.), the web page identified by the link, etc.

At step 404, which is performed by electronic message retrieval module 304 in response to the user request for the electronic message's display, the electronic message requested by the user is retrieved from a digital store of the electronic messaging system. In accordance with embodiments of the disclosure, the electronic message that is displayed in response to the request comprises a short description of each item of the number of items. Consequently, the retrieval of the electronic message (by electronic message retrieval module 304) comprises ensuring that any web page link of the online provider associated with any item of the online provider referenced in the electronic message is excluded from the electronic message.

The ensuring comprising ensuring that (when the electronic message is displayed via electronic messaging user interface module 302) information about an item of the online provider is displayed in the electronic message rather than any associated web page link of the online provider associated with the item.

In accordance with one or more embodiments, the online provider's electronic message can comprise web page links to items, a short description of each item rather than a link for each item, or some combination. A determination is made (e.g., by electronic message retrieval module 304) whether or not the user-selected electronic message contains any web page links to items of the online provider. With reference to email message 508 of FIG. 5, the determination is made whether the email message includes any web page links (to one or more items for ordering at Walmart®'s online site). In the case that the electronic message contains web page links, the disclosed systems and methods replace each link with information about the item (e.g., an item description).

For example, the determination whether or not an email message includes web page links can be made by parsing the email message to find any such links. As yet further illustration, the underlying email message can be written in a markup language, such as and without limitation, the Hypertext Markup Language (or HTML). In such a case, the HTML source of the email message can be searched, or parsed, to determine whether or not the source includes an HTML element (or tag) comprising a link to an external source (e.g., a link to a web page of the online provider. For example, the "a" element in HTML can include an "href" attribute name together with an attribute value that points to a web page of the online provider. The attribute value pointing to the web page might be a universal resource locator (or URL) comprising a domain name of the online provider. In the case of Walmart®, the URL includes www.walmart.com.

In accordance with one or more embodiments, in the case that the electronic message contains one or more links (each link corresponding to an item, or a linked item), each link contained in the electronic message is replaced with a short description of the linked item prior to the display of the contents of the electronic message. That is, unlike the conventional approach of displaying a sender's link (e.g., to a web page corresponding to the linked item), the disclosed systems and methods display an electronic message without the link and with information about the linked item in place of the link.

Figure 6:
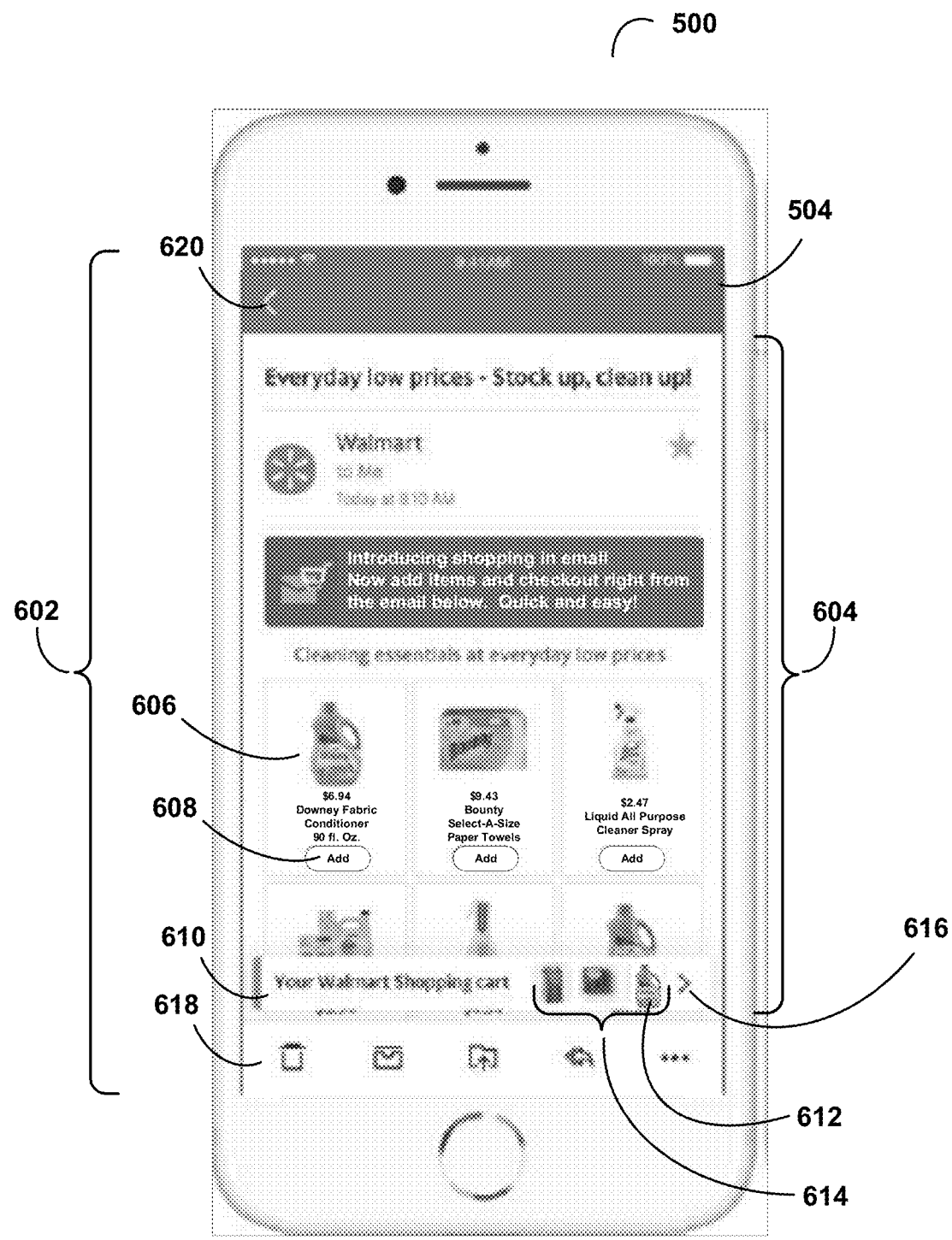

FIG. 6 provides an exemplary example of a display 602 provided by electronic messaging user interface module 302, for display at client device 500, in accordance with embodiments of the present disclosure. Display 602 comprises a display 604 of the user-selected email message 508. The display 602 is provided by electronic messaging user interface module 302 in response to the user's selection of email message 508 in display 502. The display 604 includes a number of items offered at the e-commerce web site of Walmart®. Rather than web links to the items, the display 604 of the user-selected message comprises information about the items available from Walmart®. For example, entry 606 corresponds to an item of fabric conditioner. Rather than a web link that would cause the user to be transferred to Walmart®'s web site when activated by the user, the display 604 includes display entry 606 comprising information about the fabric conditioner (e.g., an image of the item, descriptive information, size, price, etc.) in place of the web link.

In accordance with one or more embodiments, a web link can be replaced with information associated with the item, such as and without limitation information contained in the web link, information contained in the web page identified by the web link, or some combination thereof. For example, the web link can be replaced by information descriptive of the item, e.g., an item name (e.g., Downy Fabric Conditioner), size (e.g., "90 fl. oz."), price (e.g., $6.94), color, etc. The item name and size, for example, can be extracted from the following web link (from the original electronic message sent by Walmart®):

"www.walmart.com/ip/Downy-Ultra-Liquid-Fabric-Conditioner-April Fresh-105-Loads-90-fl-oz/14574631

By way of a further non-limiting example, other information (e.g., an image of the item, price, quantities available, and the like) might be extracted from the web page associated with the above web link. In the example web link shown above, the link includes a unique item identifier, "14574631", which can be extracted (e.g., by item processing module 306) and associated (in database 320) with the entry 606. The item identifier can be used by item processing module 306 when submitting an order for the item requested by the user.

Thus, at step 404 of FIG. 4, the electronic message retrieval module 304 provides the electronic message excluding any web page links to items to electronic messaging user interface module 302, which provides a display of the email message comprising item information in place of any web page links (which are designed to transfer the user from the electronic messaging system to the sender's web site). In a case that a user-selected email message does contain one or more web page links corresponding to items of the online provider, a view of the user-selected email message is constructed to ensure that the web page links are not displayed, but rather the web page links re replaced with information descriptive of each item.

In accordance with some embodiments, the newly-constructed email message is stored (via electronic message retrieval module 304) in a digital store (e.g., database 320) of the electronic messaging system so that it can be retrieved for display by the electronic messaging system in a case that the user subsequently selects the email message for display.

In accordance with one or more embodiments, an online provider can be registered with the electronic messaging system (via registration module 308). As a registered sender, the online provider can agree to exclude web page links from its electronic messages and to use information descriptive of each of its items in place of any web links. In accordance with at least one embodiment, a registered sender can include a digital signature (e.g., in a header of the electronic message), which can be located (e.g., by parsing the electronic message), extracted and verified to identify the sender as a registered sender. In addition, the electronic message can be analyzed (e.g., as discussed above) to ensure that the message does not include any web page links. By way of a non-limiting example, a registered sender can use Accelerated Mobile Pages (AMP) for email so that the content of the email message can be displayed by the electronic messaging user interface 302.

Referring again to FIG. 6, each item (offered by the online provider) in the display 604 of the user-selected email message has an associated button (e.g., "Add" button 608), which can be selected by the user to add the item to a digital store of selected items associated with the user (the online provider and the electronic message) maintained by the electronic messaging system (e.g., item processing module 306 via database 320).

At step 408, item selection input is received (e.g., via the "Add" button 608 associated with an item) by the electronic messaging user interface module 302. Information about the selected item is then stored, at step 410 (e.g., by item processing module 306) in a digital store of user-selected items associated with the user (e.g., in database 320). In accordance with one or more embodiments, the digital store of user-selected items can comprise, for each item in the digital store, item identification information (e.g., item name, part number, model number, stock keeping unit (SKU), universal product code (UPC), International Standard Book Number (ISBN), online provider's unique item identification code), online provider identification information (e.g., online provider's name, universal resource locator (URL), etc.) and user-specified information such as and without limitation quantity, size, color, etc.

As discussed above, a unique item identifier retrieved from the web page link, the web page, etc. associated with the item's entry in display 602 can be retrieved and associated with the user-selected item in the digital store of user-selected items in response to the user's selection of button 608 associated with item 606 in display 602.

In addition to an ability to add an item to the digital store of user-selected items, the disclosed systems and methods provides tools for use in the electronic messaging system to edit the digital store of user-selected items (e.g., delete an item from the digital store of user-selected items, change the quantity of an item in the digital store, etc.) and to submit an order request, from within the electronic messaging system (and its user interface) to order the items in the digital store of the user-selected items from the online provider(s) associated with each item in the digital store.

At step 410, in response to receipt of the input indicating the user's item selection (at step 408), the electronic messaging user interface module 302 displays a confirmation of the item selection in the user interface. In the example of FIG. 6, the confirmation display comprises user interface element 610, which includes an indicator 612 of the item (e.g., an image of the selected item). In the example of FIG. 6, indicator 612 is one of a number of indicators 614 of items selected by the user. In accordance with one or more embodiments, user interface element 610 notifies the user of the items contained in the digital store of user-selected items associated with at least one online provider. A scroll capability is available (e.g., via user interface element 616) to view all of the items selected by the user.

In display area 504 of FIG. 6, a user interface element 620 (e.g., a "Back" arrow) allows the user to return to display 502 of FIG. 5. Display area 618 of FIG. 6 allows the user to delete the current email message (e.g., the message displayed in display 602), generate a new email message, save the current email message in a folder or reply to the current email message.

Figure 7:

In accordance with one or more embodiments, the user can view a more detailed listing of the items stored in the digital store of user-selected items by clicking in user interface element 610 of FIG. 6. FIG. 7 provides an exemplary example of a detailed view of user-selected items stored in a digital of user-selected items. In FIG. 7, the user-selected items comprise items selected from one or more electronic messages displayed by electronic messaging user interface module 302.

Display area 702 comprises a listing of the items selected by the user. The listing includes an entry 704 added to the list in response to the user's selection of "Add" button 608 of FIG. 6. Entry 704 includes an image representative of each user-selected item, a textual description of the user-selected item (e.g., "Downey Fabric Condition, 90 fl. oz."), and a quantity of the item. Other information not shown in FIG. 7 can be included in the display 702, such as and without limitation color.

By way of some non-limiting examples, an item that can be displayed in an online provider's email message can be a product, good, service, etc. The digital store of user-selected items can be represented in the electronic messaging system's user interface as a user interface element (e.g., a shopping cart user interface element, such as element 610 of FIG. 6).

In accordance with at least one embodiment, the electronic messaging system provides an ability to process requests (e.g., order, add, delete, update) by the user in connection with items in the digital item storage of user-selected items. In accordance with at least one embodiment, the display of FIG. 7 can be used to edit the digital store (e.g., delete an item, change a quantity, size, etc.), and the like. In addition and in accordance with at least one embodiment, the user can submit an order for the items in the digital store of user-selected items with the online provider(s) associated with items in the digital store.

At step 414, an item processing request is received from the user in connection with the digital store of user-selected items. In the example shown in FIG. 7, the user can select user interface element 708 in display area 706. In addition, to the user interface element (e.g., button) 708, display area 706 includes information indicating the number of items in the digital store of user-selected items, the total cost of the items, a delivery address for delivering the items being ordered and payment information (e.g., information identifying the credit card currently set to be used for the order—e.g., the last four digits of the credit card).

As discussed herein, input other than an order request can be received at step 414. For example, the user input can be a request to delete an item from the user-selected items, update information (e.g., change a size, color, quantity, etc.) associated with a user-selected item, add an item to the user-selected items, etc. In response, the item processing module 306 can update the digital store of user-selected items accordingly (e.g., update an item's information in the store, add a new item to the digital store, delete an item from the items in the digital store, etc.

In accordance with embodiments of the present disclosure, the user is able to submit a request, from within the electronic messaging system (and its user interface) to order each item in a digital store of the user-selected items from each online provider(s) associated with an item in the digital store. In response to an order request received from the user interface of the electronic messaging system (via the electronic messaging user interface module 302) and by a user of the electronic messaging system, the order request is processed by item processing module 306 with respect to each item in the digital store of user-selected items (e.g., the digital store of user-selected items associated with the order request and maintained by the electronic messaging system) by coordinating with each online provider having an item in the digital store of user-selected items.

In accordance with at least one embodiment, the digital store of user-selected items can store items associated with different online providers, so that the digital store of user-selected items can comprise items from different online providers at any time. In a case that the digital store of the user's selected items includes items from a number of online providers, the disclosed systems and methods coordinate the user's request with each online provider. Alternatively, the disclosed systems and methods can maintain multiple digital stores of user-selected items (e.g., a different digital store for each online provider) for a user. In any case, the disclosed systems and methods can maintain a digital store of user-selected items selected by a user from different electronic messages (of one or more online providers).

Figure 8:

FIG. 8 provides an exemplary example of a display (provided by electronic messaging user interface module 302) showing a display corresponding to a digital store of user-selected items selected from electronic messages sent by different online providers (e.g., Walmart® and Safeway®). Items 810 and 812 were selected by the user from within at least one email message sent by Walmart® and item 814 was selected by the user from within an email message sent by Safeway®. As discussed above, the item processing module 306 processes the order request and coordinates the order of the items selected by the user from within the electronic messaging system's user interface with each online provider of an item in the digital store.

While the example shown in FIG. 8 shows one delivery address and payment option, embodiments of the present disclosure allow the user to specify different addresses and/or payment options (for different items and/or different online providers).

In accordance with one or more embodiments, user registration module 308 can maintain (e.g., in database 320) information for electronic message recipients and senders. As discussed above, user registration module 308 can maintain information (e.g., in database 320) for each online provider (as electronic message senders) registered with the electronic messaging system, such as and without limitation a digital signature (or other encrypted information) for use in identifying an electronic message as being sent from a registered sender.

In addition, the user registration module can maintain (e.g., in database 320) information about electronic message recipients, including logins, passwords, shipping address, billing address and credit card details. The user registration module 308 allows a registered user to add, delete, update, etc. its information.

In accordance with one or more embodiments, the user registration module 308 provides an online wallet mechanism that can be used by the item processing module 306 to coordinate a user's order request.

In accordance with one or more embodiments, the electronic messaging system submits an order to an online provider identifying each item in the digital store of user-selected items associated with the online provider. In accordance with at least one embodiment, an order can be submitted to a merchant using the merchant's Application Programming Interface (API). For example, the online provider's API can be used to act on the user's behalf and submit the order request to the online provider. Examples of information provided to the online provider include without limitation the user's information (e.g., name, billing address, shipping address, credit card information, etc.) and item information (item identification information, quantity, size, color, etc.). Other options for handling the user's order request include without limitation use of OBI (Open Buying on the Internet) and Epay. OBI provides a standardized approach for business-to-business purchasing on the web. OBI allows orders to be securely placed and payment made. Epay provides a mechanism for processing payment.

Information received from the online provider regarding the order request, such as confirmation of the order, shipping, delivery, etc. is provided to the user via the electronic messaging system's user interface. Referring again to FIG. 4, at step 416, the electronic messaging user interface module 302 can provide confirmation of the user's request in the electronic messaging system's user interface.

Figure 9:
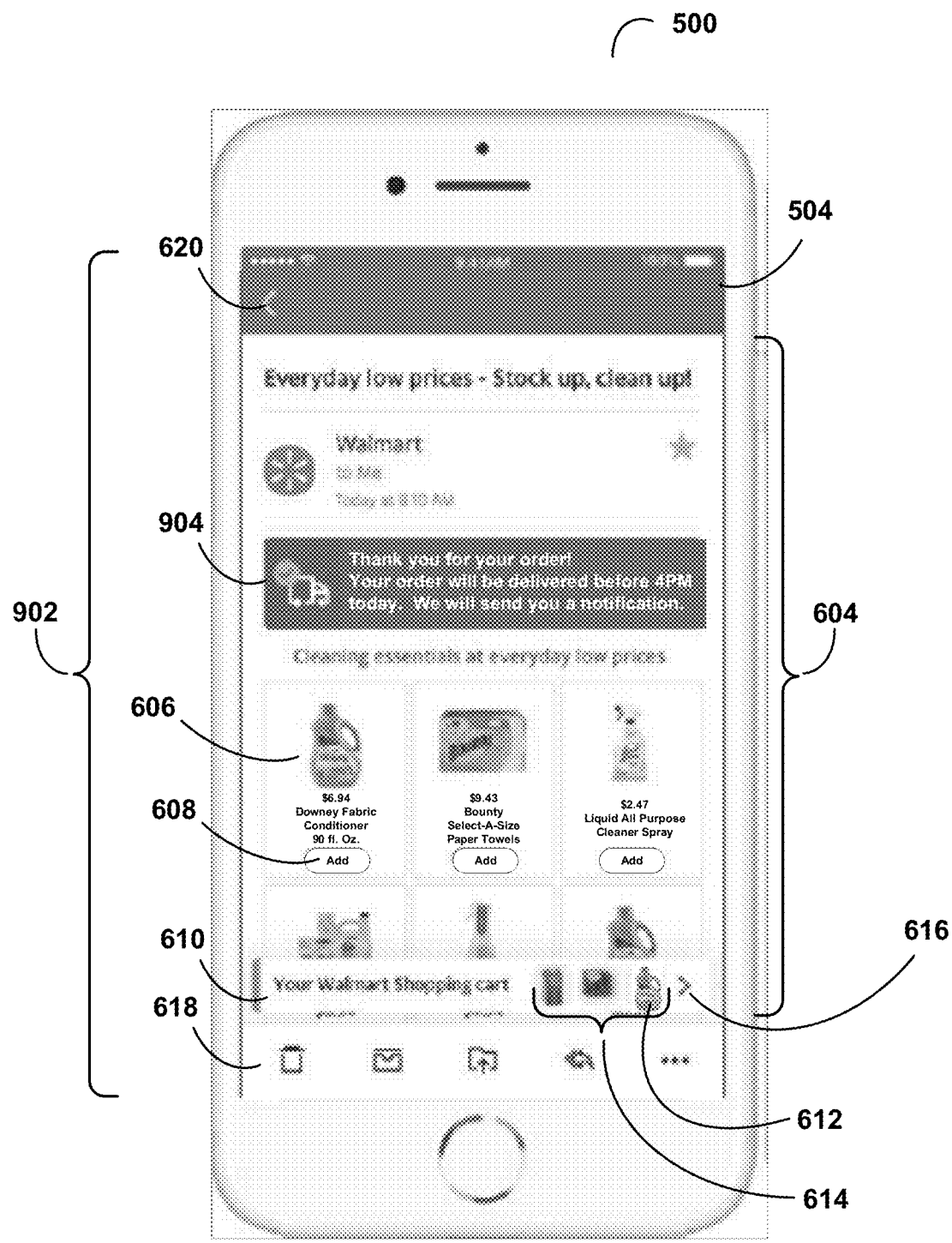

FIG. 9 provides an exemplary example of a user interface notification 904 displayed in response to an order request received from the user (e.g., at step 414 of FIG. 4). In the example, user interface display 802 is provided by electronic messaging user interface module 302 upon the completion of the order processing by item processing module 306. The user interface display 902 includes display area 904 including a notification (using information provided by the online provider) to the user indicating that the order was completed and including delivery information.

The notification, in display area 904, further indicates that the user will receive further updates and notifications of the user's order in the user interface of the electronic messaging system. Such updates might include additional delivery information (e.g., tracking information), order updates (e.g., changes made by the online provider to the order), and the like.

Information displayed in user interface display area 904 (as well as any subsequent information and notifications provided by electronic message user interface module 302) can be extracted (e.g., via electronic message retrieval module 304 and item processing module 306) from one or more electronic messages sent by the online provider in response to the submission of an order by item processing module 306.

Figure 10:
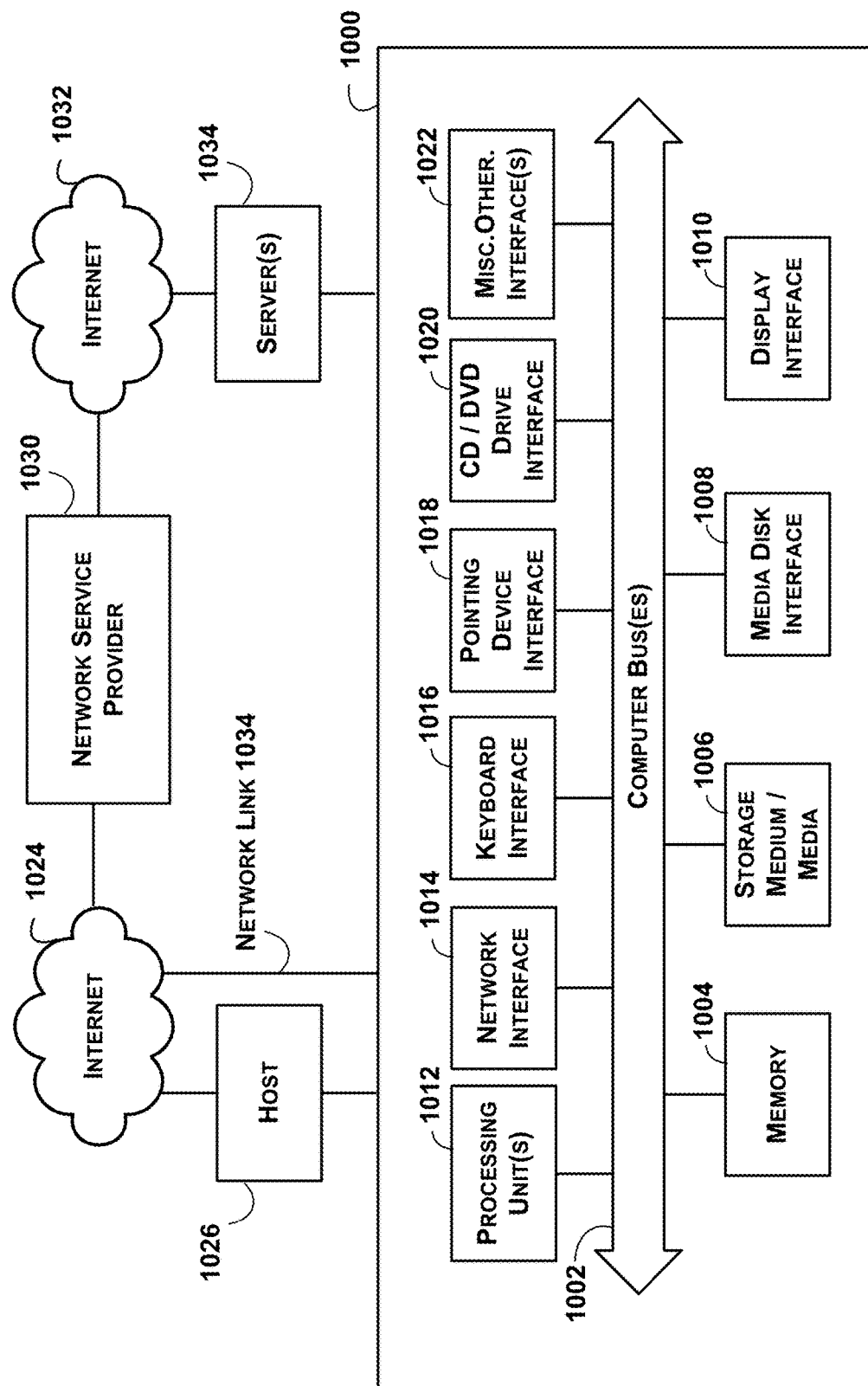
FIG. 10 is a block diagram illustrating the architecture of an exemplary hardware device in accordance with one or more embodiments of the present disclosure.

FIG. 10 provides an exemplary example of an internal architecture. As shown in FIG. 10, internal architecture 1000 of a computing device(s), computing system, computing platform, user devices, set-top box, smart TV and the like includes one or more processing units, processors, or processing cores, (also referred to herein as CPUs) 1012, which interface with at least one computer bus 1002. Also interfacing with computer bus 1002 are computer-readable medium, or media, 1006, network interface 1014, memory 1004, e.g., random access memory (RAM), run-time transient memory, read only memory (ROM), media disk drive interface 1020 as an interface for a drive that can read and/or write to media including removable media such as floppy, CD-ROM, DVD, media, display interface 1010 as interface for a monitor or other display device, keyboard interface 1016 as interface for a keyboard, pointing device interface 1018 as an interface for a mouse or other pointing device, and miscellaneous other interfaces not shown individually, such as parallel and serial port interfaces and a universal serial bus (USB) interface.

Memory 1004 interfaces with computer bus 1002 so as to provide information stored in memory 1004 to CPU 1012 during execution of software programs such as an operating system, application programs, device drivers, and software modules that comprise program code, and/or computer executable process steps, incorporating functionality described herein, e.g., one or more of process flows described herein. CPU 1012 first loads computer executable process steps from storage, e.g., memory 1004, computer readable storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage, e.g., medium/media 1006, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1028 typically provides information communication using transmission media through one or more networks to other devices that use or process the information. For example, network link 1028 may provide a connection through local network 1024 to a host computer 1026 or to equipment operated by a Network or Internet Service Provider (ISP) 1030. ISP equipment in turn provides data communication services through the public, worldwide packet-switching communication network of networks now commonly referred to as the Internet 1032.

A computer called a server host 1034 connected to the Internet 1032 hosts a process that provides a service in response to information received over the Internet 1032. For example, server host 1034 hosts a process that provides information representing video data for presentation at display 1010. It is contemplated that the components of system 1000 can be deployed in various configurations within other computer systems, e.g., host and server.

At least some embodiments of the present disclosure are related to the use of computer system 1000 for implementing some or all of the techniques described herein. According to one embodiment, those techniques are performed by computer system 1000 in response to processing unit 1012 executing one or more sequences of one or more processor instructions contained in memory 1004. Such instructions, also called computer instructions, software and program code, may be read into memory 1004 from another computer-readable medium 1006 such as storage device or network link. Execution of the sequences of instructions contained in memory 1004 causes processing unit 1012 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1000. Computer system 1000 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1002 as it is received, or may be stored in memory 1004 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
receiving, at a computing device, a request of a user of an electronic messaging system to display an electronic message from an online provider directed to the user of the electronic messaging system;
retrieving, via the computing device and from a digital storage of the electronic messaging system, the electronic message requested by the user, the retrieving comprising ensuring that any web page link of the online provider associated with any item of the online provider referenced in the electronic message is excluded from the electronic message, the ensuring comprising ensuring that information about an item of the online provider is contained in the electronic message rather than an associated web page link of the online provider for the item;
displaying in the electronic messaging system's user interface, via the computing device and in response to the display request of the user, the electronic message with the information about each item rather than the web page link associated with the item;
receiving, via the computing device and in the electronic messaging system's user interface, item selection input of the user indicating a selection of an item from the display of the electronic message;
storing, via the computing device and in the digital storage of the electronic messaging system, information about the selected item;
displaying, via the computing device and in response to the user selection input, a user interface element representing the user-selected item in the electronic messaging system's user interface, the user interface element comprising an indicator that the user-selected item is stored in a digital store of user-selected items;
receiving, via the computing device and the user interface element displayed in the electronic messaging system's user interface, a request of the user regarding the item included in the digital store of user-selected items; and
performing, via the computing device and using the electronic messaging system, at least one operation in response to the request of the user regarding the item included in the digital store of user-selected items.

2. The method of claim 1, further comprising:
receiving, via the computing device, the electronic message from the online provider;
analyzing, via the computing device, the electronic message to determine whether or not the electronic message contains any web page links of the online provider associated with items of the online provider;
generating, via the computing device, a modified electronic message using the electronic message received from the online provider and removing the web page links, removing a web link associated with a given item comprising replacing the web link with the information about the given item; and
storing the modified electronic message, via the computing device and in the digital storage of the electronic messaging system, the retrieving of the electronic message in response to the request of the user and from digital storage of the electronic messaging system comprising retrieval of the modified electronic message.

3. The method of claim 2, the analyzing comprising:
authenticating, using authentication information in the electronic message, the online provider as a sender registered with the electronic messaging system to send electronic messages with item information rather than a web page link.

4. The method of claim 3, the authentication information comprising an encrypted signature in the electronic message.

5. The method of claim 1, performing at least one operation further comprising:
placing, via the computing device, an order for the item included in the digital store of user-selected items in response to the request of the user.

6. The method of claim 5, further comprising:
accessing, via the computing device, an online wallet digital data store to retrieve order submission information of the user;
retrieving, via the computing device and from the digital store of the electronic messaging system, the selected information about the item;

submitting, via the computing device, the order submission information of the user and the selected information about the item to the online provider with a request to order the selected item;

receiving, via the computing device and from the online provider, information confirming the order of the selected item; and displaying, via the computing device and the electronic messaging system's user interface, confirmation of the order of the selected item.

7. The method of claim 6, the submitting comprising using login information of the user to log in at the online provider for the user and to submit the order submission information.

8. The method of claim 6, the order submission information comprising user identification information including credit card information of the user.

9. The method of claim 1, further comprising:
receiving, via the computing device and from the online provider, information updating the order submission; and displaying, via the computing device, the information updating the order submission in the electronic messaging system's user interface.

10. The method of claim 1, further comprising:
extracting, via the computing device, the information updating the order submission from a second electronic message received from the online provider, the information updating the order submission being displayed in the electronic messaging system's user interface without the user making a request to open the second electronic message.

11. The method of claim 1, the digital store of user-selected items comprising a number of items selected by the user from multiple electronic messages from the online provider.

12. The method of claim 1, the digital store of user-selected items comprising a number of items selected by the user from multiple electronic messages from multiple online providers.

13. The method of claim 1, further comprising:
displaying, via the computing device and using the electronic messaging system's user interface, a dialog to receive online wallet information.

14. A non-transitory computer-readable storage medium tangibly encoded with computer-executable instructions that when executed by a processor associated with a computing device perform a method comprising:
receiving a request of a user of an electronic messaging system to display an electronic message from an online provider directed to the user of the electronic messaging system;

retrieving, from a digital storage of the electronic messaging system, the electronic message requested by the user, the retrieving comprising ensuring that any web page link of the online provider associated with any item of the online provider referenced in the electronic message is excluded from the electronic message, the ensuring comprising ensuring that information about an item of the online provider is contained in the electronic message rather than an associated web page link of the online provider for the item;

displaying in the electronic messaging system's user interface, in response to the display request of the user, the electronic message with the information about each item rather than the web page link associated with the item;

receiving, in the electronic messaging system's user interface, item selection input of the user indicating a selection of an item from the display of the electronic message;

storing, in the digital storage of the electronic messaging system, information about the selected item;

displaying, in response to the user selection input, a user interface element representing the user-selected item in the electronic messaging system's user interface, the user interface element comprising an indicator that the user-selected item is stored in a digital store of user-selected items;

receiving, via the user interface element displayed in the electronic messaging system's user interface, a request of the user regarding the item included in the digital store of user-selected items; and performing, using the electronic messaging system, at least one operation in response to the request of the user regarding the item included in the digital store of user-selected items.

15. The non-transitory computer-readable storage medium of claim 14, further comprising:
receiving the electronic message from the online provider;
analyzing the electronic message to determine whether or not the electronic message contains any web page links of the online provider associated with items of the online provider;

generating a modified electronic message using the electronic message received from the online provider and removing the web page links, removing a web link associated with a given item comprising replacing the web link with the information about the given item; and storing the modified electronic message, via the computing device and in the digital storage of the electronic messaging system, the retrieving of the electronic message in response to the request of the user and from digital storage of the electronic messaging system comprising retrieval of the modified electronic message.

16. The non-transitory computer-readable storage medium of claim 15, the analyzing comprising:
authenticating, using authentication information in the electronic message, the online provider as a sender registered with the electronic messaging system to send electronic messages with item information rather than a web page link.

17. The non-transitory computer-readable storage medium of claim 15, the authentication information comprising an encrypted signature in the electronic message.

18. The non-transitory computer-readable storage medium of claim 14, performing at least one operation further comprising:
placing, via the computing device, an order for the item included in the digital store of user-selected items in response to the request of the user.

19. The non-transitory computer-readable storage medium of claim 18, further comprising:
accessing an online wallet digital data store to retrieve order submission information of the user;
retrieving, from the digital storage of the electronic messaging system, the selected information about the item;
submitting the order submission information of the user and the selected information about the item to the online provider with a request to order the selected item;
receiving, from the online provider, information confirming the order of the selected item; and displaying, via the electronic messaging system's user interface, confirmation of the order of the selected item.

20. A computing device comprising:

a processor;

a non-transitory storage medium for tangibly storing thereon program logic for execution by the processor, the program logic comprising:

receiving logic executed by the processor for receiving a request of a user of an electronic messaging system to display an electronic message from an online provider directed to the user of the electronic messaging system;

retrieving logic executed by the processor for retrieving, from a digital storage of the electronic messaging system, the electronic message requested by the user, the retrieving comprising ensuring that any web page link of the online provider associated with any item of the online provider referenced in the electronic message is excluded from the electronic message, the ensuring comprising ensuring that information about an item of the online provider is contained in the electronic message rather than an associated web page link of the online provider for the item;

displaying logic executed by the processor for displaying in the electronic messaging system's user interface, in response to the display request of the user, the electronic message with the information about each item rather than the web page link associated with the item;

receiving logic executed by the processor for receiving, in the electronic messaging system's user interface, item selection input of the user indicating a selection of an item from the display of the electronic message;

storing logic executed by the processor for storing, in the digital storage of the electronic messaging system, information about the selected item;

displaying logic executed by the processor for displaying, in response to the user selection input, a user interface element representing the user-selected item in the electronic messaging system's user interface, the user interface element comprising an indicator that the user-selected item is stored in a digital store of user-selected items;

receiving logic executed by the processor for receiving, via the user interface element displayed in the electronic messaging system's user interface, a request of the user regarding the item included in the digital store of user-selected items; and performing logic executed by the processor for performing, using the electronic messaging system, at least one operation in response to the request of the user regarding the item included in the digital store of user-selected items.

\* \* \* \* \*